US008471819B2

(12) United States Patent
You et al.

(10) Patent No.: US 8,471,819 B2
(45) Date of Patent: *Jun. 25, 2013

(54) MOBILE COMMUNICATIONS TERMINAL HAVING KEY INPUT ERROR PREVENTION FUNCTION AND METHOD THEREOF

(75) Inventors: Hyaung-Sic You, Seoul (KR); Jin-Won Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 806 days.

This patent is subject to a terminal disclaimer.

(21) Appl. No.: 12/435,369

(22) Filed: May 4, 2009

(65) Prior Publication Data

US 2009/0215500 A1 Aug. 27, 2009

Related U.S. Application Data

(63) Continuation of application No. 11/690,949, filed on Mar. 26, 2007, now Pat. No. 7,535,459.

(30) Foreign Application Priority Data

Mar. 28, 2006 (KR) ........................ 10-2006-0028095

(51) Int. Cl.
*G09G 5/00* (2006.01)

(52) U.S. Cl.
USPC ........................................... 345/169; 341/22

(58) Field of Classification Search
USPC ....... 345/156, 168, 169; 341/22–26; 400/472, 400/477, 480, 485–487
See application file for complete search history.

(56) References Cited

U.S. PATENT DOCUMENTS

| 5,424,730 | A | 6/1995 | Sasaki et al. |
| 5,734,928 | A | 3/1998 | Nakasuji |
| 6,230,222 | B1 | 5/2001 | Rush |
| 7,535,459 | B2 | 5/2009 | You et al. |
| 2005/0035951 | A1 | 2/2005 | Bjorkengren |
| 2005/0079896 | A1 | 4/2005 | Kokko et al. |

FOREIGN PATENT DOCUMENTS

| EP | 1292086 | 3/2003 |
| GB | 2402105 | 12/2004 |
| JP | 6134108 | 2/1986 |
| JP | 63314631 | 12/1988 |
| JP | 3225410 | 10/1991 |
| JP | 3252718 | 11/1991 |
| JP | 535430 | 2/1993 |
| JP | 05-158603 | 6/1993 |
| JP | 07-306752 | 11/1995 |
| JP | 08095709 | 4/1996 |
| JP | 10055238 | 2/1998 |
| JP | 11175237 | 7/1999 |
| JP | 2002041216 | 2/2002 |
| JP | 2002-532782 | 10/2002 |
| JP | 2004037294 | 2/2004 |
| JP | 2005204251 | 7/2005 |
| RU | 2001121807 | 7/2003 |
| WO | 02/27455 | 4/2002 |
| WO | 2005/073839 | 8/2005 |

*Primary Examiner* — Regina Liang
(74) *Attorney, Agent, or Firm* — Lee, Hong, Degerman, Kang & Waimey (57) ABSTRACT

A mobile communications terminal and a method for preventing an input error of a key input unit are provided. The mobile communications terminal includes a touch sensor unit for sensing a key that is input by touching a keypad region in order to output a key input signal corresponding to the key and a controller adapted to determine a key input according to either a priority between multiple keys from which key signals are received or whether a received key signal was generated inadvertently.

21 Claims, 10 Drawing Sheets

| TYPE OF KEY INPUT ERROR | | LOWER NAVIGATION KEY IS SIMULTANEOUSLY INPUT | | UPPER NAVIGATION KEY IS SIMULTANEOUSLY INPUT | | LEFT/RIGHT NAVIGATION KEY IS SIMULTANEOUSLY INPUT | |
|---|---|---|---|---|---|---|---|
| | | ERROR RATIO | NUMBER OF TIMES | ERROR RATIO | NUMBER OF TIMES | ERROR RATIO | NUMBER OF TIMES |
| TOTAL | | 57% | 191 | 23% | 79 | 8% | 28 |

MOBILE COMMUNICATIONS TERMINAL HAVING KEY INPUT ERROR PREVENTION FUNCTION AND METHOD THEREOF

CROSS-REFERENCE TO RELATED APPLICATIONS

This application is a continuation of U.S. application Ser. No. 11/690,949 filed Mar. 26, 2007, now U.S. Pat. No. 7,535,459, which claims the benefit of earlier filing date and right of priority to Korean Application No. 10-2006-0028095, filed on Mar. 28, 2006, the contents of which are hereby incorporated by reference herein in its entirety.

FIELD OF THE INVENTION

The present invention relates to a key input method of a mobile communications terminal, and specifically, to a mobile communications terminal having a function for preventing an input error of a touch-type key input unit and a key input method thereof.

DESCRIPTION OF THE RELATED ART

In general, mobile communications terminals can support various additional functions such as Short Message Service (SMS) or chatting, web surfing, scheduling, memo or games as well as voice communication and are provided with a keypad for controlling the functions. Although mobile communications terminals may have different designs, the keypads generally function such that a contact point of each key is contacted with a contact point pattern disposed on a print substrate of a terminal main body upon pressing an upper portion of each key constituting the keypad.

Accordingly, a related art mobile communications terminal having a keypad that functions according to the general pressing method has a disadvantage in that an excessive force is applied to a user's finger upon pressing a key. In order to solve the problem, touch-type keypads have recently been used in mobile communications terminals.

However, unlike a keypad utilizing the "pressing method", touch-type keypad may have a disadvantage in that an unintended key function is input by simply contacting keys on the keypad. The potential to input an unintended key function makes it difficult to arrange keys at narrower intervals, thereby complicating efforts to miniaturize the mobile communications terminal.

SUMMARY OF THE INVENTION

An object of the present invention is to provide a method for preventing a key input error generated when keys of a touch-type key input unit are arranged at narrow intervals and a mobile communications terminal having a key input error prevention function for a touch-type key input unit.

In one aspect of the present invention, a method for detecting a key input in a mobile communication terminal having a plurality of touch keys is provided. The method includes detecting an input signal corresponding to two or more of the plurality of touch keys and determining one of the two or more touch keys as the key input according to a priority of the two or more touch keys.

It is contemplated that determining one of the two or more touch keys as the key input includes determining a pre-assigned priority of each of the two or more touch keys and determining the touch key of the two or more touch keys that has the highest priority as the key input. It is further contemplated that the pre-assigned priority of each of the two or more touch keys is derived from statistical analysis.

It is contemplated that the pre-assigned priority of each of the two or more touch keys is determined according to a position of the plurality of touch keys on a keypad of the mobile communication terminal. It is further contemplated that the plurality of touch keys are arranged on the keypad in at least two rows and the priority of each of plurality of touch keys is pre-assigned such that a first touch key in an uppermost row has higher priority than a second touch key in a lower row if the first and second touch keys are located in different rows.

It is contemplated that the plurality of touch keys are arranged on the keypad in at least two columns and the priority of each of the plurality of touch keys is pre-assigned such that a directional navigation touch key has higher priority than a non-directional navigation touch key if the directional navigation touch key and non-directional navigation touch key are located in the same row. It is further contemplated that determining one of the two or more touch keys as the key input includes measuring a time for the input signal corresponding to each of the two or more touch keys to reach a reference level and determining the touch key of the two or more touch keys having the shortest measured time as the key input. Preferably, determining one of the two or more touch keys as the key input further includes determining that the level of the input signal corresponding to at least one of the two or more touch keys varies within a predetermined range and measuring the time for the average level of the input signal corresponding to the at least one of the two or more touch keys to reach the reference level.

In another aspect of the present invention, a method for detecting a key input in a mobile communication terminal having a plurality of touch keys is provided. The method includes determining that a task is currently being performed, identifying at least a first of the plurality of touch keys that is not related to the task currently being performed and at least a second of the plurality of touch keys that is related to the task currently being performed, adjusting a sensitivity level associated with the identified first touch key to be lower than a sensitivity level associated with the second touch key, detecting an input signal corresponding to one of the plurality of touch keys and determining whether the touch key corresponding to the detected input signal is a key input according to a sensitivity level associated with the touch key.

It is contemplated that determining whether the touch key corresponding to the detected input signal is a key input includes measuring a period of time that the input signal is continuously maintained above a threshold level corresponding to the touch key and determining the touch key corresponding to the detected input signal as a key input only if the measured period of time exceeds a period of time corresponding to the sensitivity level associated with the touch key. It is further contemplated that adjusting the sensitivity level associated with the identified first touch key includes adjusting a time threshold corresponding to the identified first touch key such that the time threshold is greater than a time threshold corresponding to the identified second touch key.

It is contemplated that adjusting the sensitivity level associated with the identified first touch key includes adjusting a level threshold corresponding to the identified first touch key such that the level threshold is greater than a level threshold corresponding to the identified second touch key. It is further contemplated that measuring the period of time the input signal is continuously maintained above the threshold level includes determining that the level of the input signal varies within a predetermined range and measuring a period of time that the average input signal level is continuously maintained above the threshold level.

In another aspect of the present invention, a method for detecting a key input in a mobile communication terminal having a plurality of touch keys is provided. The method includes detecting an input signal corresponding to one of the plurality of touch keys, measuring a time for the detected input signal to reach a threshold level, calculating a gradient for the detected input signal using the measured time and determining the touch key corresponding to the detected input signal as a key input only if the calculated gradient is greater than a predetermined gradient. Preferably, calculating the gradient comprises dividing the reference level by the measured time.

In another aspect of the present invention, a mobile communication terminal is provided. The terminal includes a key pad having a plurality of touch keys located thereon and a controller adapted to detect an input signal corresponding to two or more of the plurality of touch keys and determine one of the two or more touch keys as a key input according to a priority of the two or more touch keys.

It is contemplated that the plurality of touch keys are arranged on the keypad in at least two rows. It is further contemplated that a priority of each of the plurality of touch keys is determined according to a location of each of the plurality of touch keys on the keypad.

It is contemplated that the determined priority is derived from statistical analysis. It is further contemplated that the terminal further includes a memory adapted to store the determined priority of each of the plurality of touch keys.

It is contemplated that the controller is further adapted to determine a pre-assigned priority of each of the two or more touch keys and determine the touch key of the two or more that has the highest priority as the key input. It is further contemplated that the pre-assigned priority of each of the two or more touch keys is derived from statistical analysis.

It is contemplated that the pre-assigned priority of each of the two or more touch keys is determined according to a position of the plurality of touch keys on the keypad. It is further contemplated that the plurality of touch keys are arranged on the keypad in at least two rows and the priority of each of plurality of touch keys is pre-assigned such that a first touch key in an uppermost row has higher priority than a second touch key in a lower row if the first and second touch keys are located in different rows.

It is contemplated that the plurality of touch keys are arranged on the keypad in at least two columns and the priority of each of the plurality of touch keys is pre-assigned such that a directional navigation touch key has higher priority than a non-directional navigation touch key if the directional navigation touch key and non-directional navigation touch key are located in the same row. It is further contemplated that the controller is further adapted to measure a time for the input signal corresponding to each of the two or more touch keys to reach a reference level and determine the touch key of the two or more touch keys having the shortest measured time to reach the reference level as the key input.

It is contemplated that the controller is further adapted to determine that the level of the input signal corresponding to at least one of the two or more touch keys varies within a predetermined range and measure the time for the average level of the input signal corresponding to the at least one of the two or more touch keys to reach the reference level. It is further contemplated that the controller is further adapted to determine that a task is currently being performed, identify at least a first of the plurality of touch keys that is not related to the task currently being performed and at least a second of the plurality of touch keys that is related to the task currently being performed, adjust a sensitivity level associated with the identified first touch key to be lower than a sensitivity level associated with the second touch key, detect an input signal corresponding to one of the plurality of touch keys and determine whether the touch key corresponding to the detected input signal is a key input according to a sensitivity level associated with the touch key.

It is contemplated that the controller is further adapted to measure a period of time that the input signal is continuously maintained above a threshold level corresponding to the touch key and determine the touch key corresponding to the detected input signal as a key input only if the measured period of time exceeds a period of time corresponding to the sensitivity level associated with the touch key. It is further contemplated that the controller is further adapted to adjust a time threshold corresponding to the identified first touch key such that the time threshold is greater than a time threshold corresponding to the identified second touch key.

It is contemplated that the controller is further adapted to adjust a level threshold corresponding to the identified first touch key such that the level threshold is greater than a level threshold corresponding to the identified second touch key. It is further contemplated that the controller is further adapted to determine that the level of the input signal varies within a predetermined range and measure a period of time that the average input signal level is continuously maintained above the threshold level.

It is contemplated that the controller is further adapted to detect an input signal corresponding to one of the plurality of touch keys, measure a time for the detected input signal to reach a threshold level, calculate a gradient for the detected input signal using the measured time and determine the touch key corresponding to the detected input signal as a key input only if the calculated gradient is greater than a predetermined gradient. It is further contemplated that the controller is further adapted to calculate the gradient by dividing the reference level by the measured time.

The foregoing and other objects, features, aspects and advantages of the present invention will become more apparent from the following detailed description of the present invention when taken in conjunction with the accompanying drawings. Additional features and advantages of the invention will be set forth in the description which follows, and in part will be apparent from the description, or may be learned by practice of the invention.

It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 14 A-C illustrate a comparison of a normal key input signal, static electricity and a noise signal.

DETAILED DESCRIPTION OF THE PREFERRED EMBODIMENTS

Description of the present invention will now be given in detail with reference to the accompanying drawings. The present invention is directed to a mobile communications terminal for preventing a key input error even when keys of the key input unit are arranged at narrow intervals by using a touch-type key input unit whereby an excessive force can be prevented from being applied to a user's finger upon contacting keys.

Figure 1:
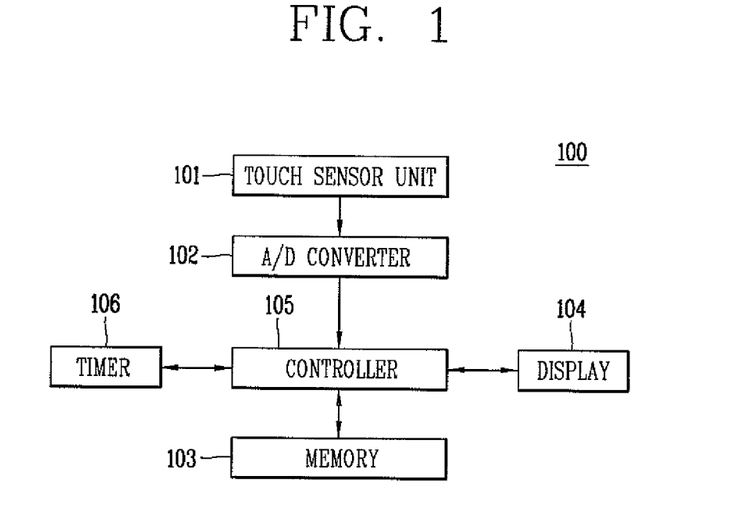
FIG. 1 is a block diagram illustrating a configuration of a mobile communications terminal having a touch-type key input unit according to the present invention.

FIG. 1 is a block diagram illustrating a configuration of a mobile communications terminal 100 having a touch-type key input unit according to the present invention. As illustrated in FIG. 1, a touch sensor unit 101 is disposed under a keypad region at a surface of a main body case, thereby sensing a key that is input by touching the keypad region.

The touch sensor unit 101 preferably utilizes a capacitance sensing method to sense the key input since keys are usually input by a user's finger. However, the touch sensor unit 101 is not limited to capacitance method. The capacitance sensing method refers to a touch-sensing technique for accurately quantitatively detecting (sensing) capacitance generated by contact with a human body that is as small as several pF.

Figure 2:
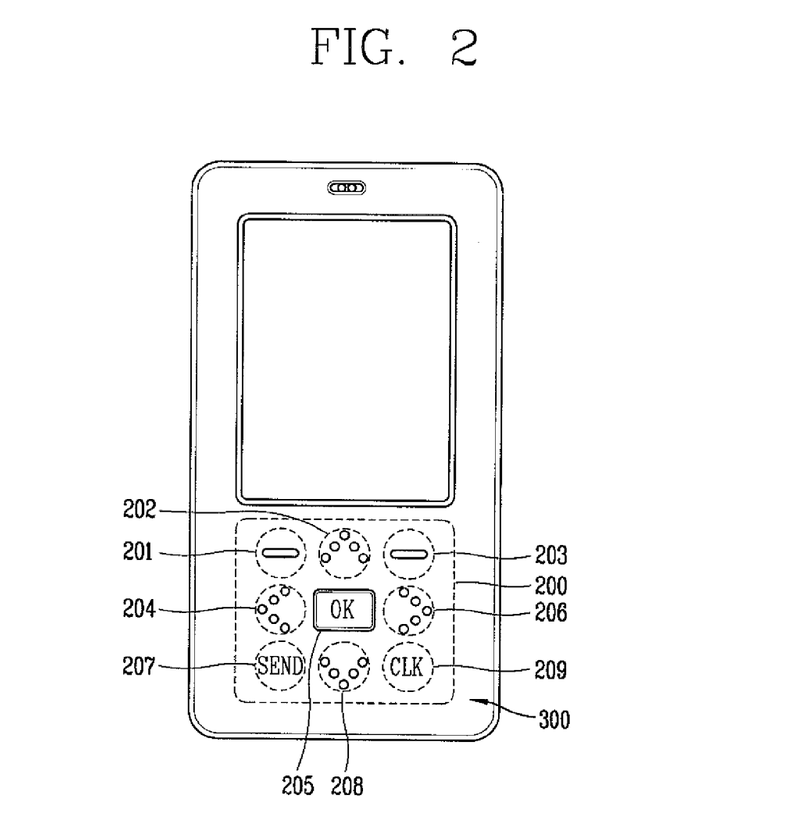
FIG. 2 illustrates a configuration of a touch-type key input unit according to the present invention.

The keypad region does not refer to the keypad that is actually mounted on the mobile communications terminal, but rather to a region 200 illustrated in FIG. 2 that represents functions and positions of keys at the surface of the main body case of mobile communications terminal 100. As illustrated in FIG. 2, the keys do not denote actual buttons, but rather keypad regions 201 through 209.

The touch sensor unit 101 includes a plurality of touch sensors (not shown). The touch sensor corresponding to each key is mounted under the corresponding keypad region 201-209. Accordingly, when a finger contacts a keypad region 201-209, a capacitance signal having a certain level is output from the touch sensor disposed under the corresponding keypad region.

The capacitance signal output from the touch sensor unit 101 is input to a controller 105. The capacitance signal may be converted into a digital signal via an Analog to Digital (A/D) converter 102 before being input to the controller 105. The A/D converter 102 may be mounted either in the controller 105 or externally.

The controller 105 detects which of the plurality of touch sensors has output the capacitance signal and determines that the key corresponding to the detected touch sensor has been input. The controller 105 then performs an operation assigned to the input key according to an operation mode of the mobile communications terminal 100. For example, under the control of the controller 105, functions related to voice communication, text messaging, games and multimedia can be performed. The controller 105 also controls the display 104 to display information related to the functions.

The mobile communications terminal 100 further includes a function for preventing a key input error. In order to provide smaller mobile communications terminals to facilitate easier carrying, a smaller interval between keys of an input keypad is preferred. Accordingly, when the interval between the keys of the keypad is narrower than a size of a finger, an unintended key located close to the intended key may be input.

An algorithm for preventing a key input error is stored in a memory 103. When a key input is detected, the controller 105 uses the key input error prevention algorithm stored in the memory 103 to determine whether a key has been normally input or, in other words, whether a key the user desires to select has been input. The controller 105 then controls a designated operation corresponding to the input key only if a normal key input, or a key input that the user desires, has occurred.

The controller 105 determines the capacitance signal input through a key input signal detecting port (not shown) as a key input signal and controls a timer 106 to detect time information related to the key input signal. The key input error prevention algorithm will be explained in detail with reference to the attached drawings.

Figure 3:
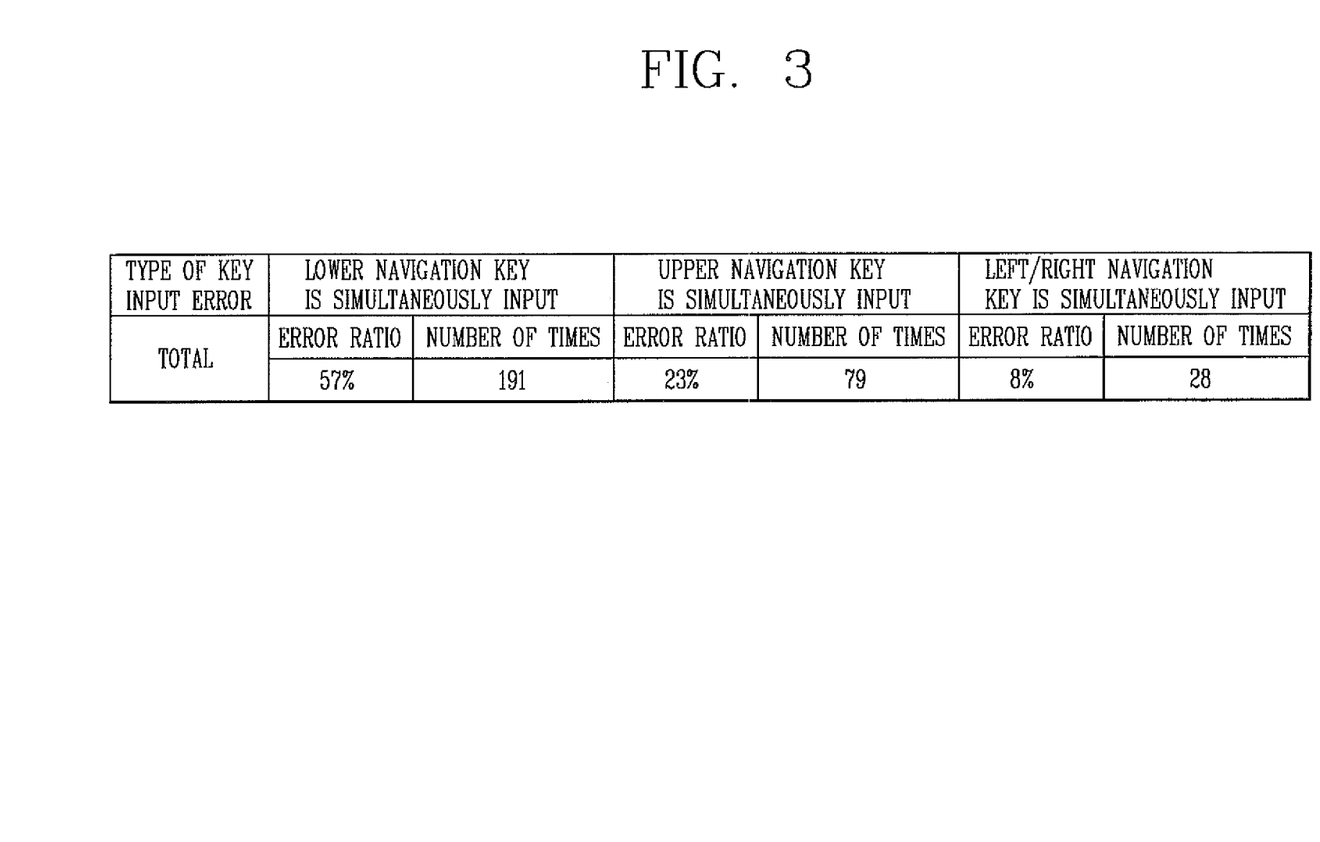
FIG. 3 is a table illustrating results of experimental analysis of the most frequently generated key input errors that are considered in embodiments of the present invention.

FIG. 3 is a table illustrating the results of experimental analysis of the most frequently generated key input errors according to embodiments of the present invention. As illustrated in FIG. 3, upon inputting a certain key on a keypad having keys arranged at certain intervals, an error ratio that a key located at a lower side of the certain key will be simultaneously input with the certain key is the highest at 57%, an error ratio that a key located at an upper side of the certain key will be simultaneously input with the certain key is second highest at 23% and an error ratio that a key located at a left or right side of the certain key will simultaneously input with the certain key is lowest at 8%.

The simultaneous input of keys refers to a plurality of keys being input within a holding time set to recognize that a key has been input and does not assume that the input time for each of the simultaneously input keys is the same. The table illustrated in FIG. 3 was generated by analyzing key input errors generated from 198 tasks corresponding to 28% of a total of 339 tasks.

As illustrated in the table, 57% of the generated errors correspond to errors where the key located at the lower side of the certain key is simultaneously input upon inputting the certain key. Furthermore, 63% of the generated errors where the lower side key is simultaneously input correspond to errors where a key located at the very lower side of the certain key is simultaneously input.

The tasks represented in FIG. 3 may include phone number registration, text message transmission, menu selection and setup, a game and multimedia play among tasks performable in the mobile communications terminal. The key input error prevention algorithm according to a first embodiment of the present invention is adapted to prevent the key input error by setting priorities for each key and determining a key having a higher priority among two or more keys input as the input key.

Figure 4:
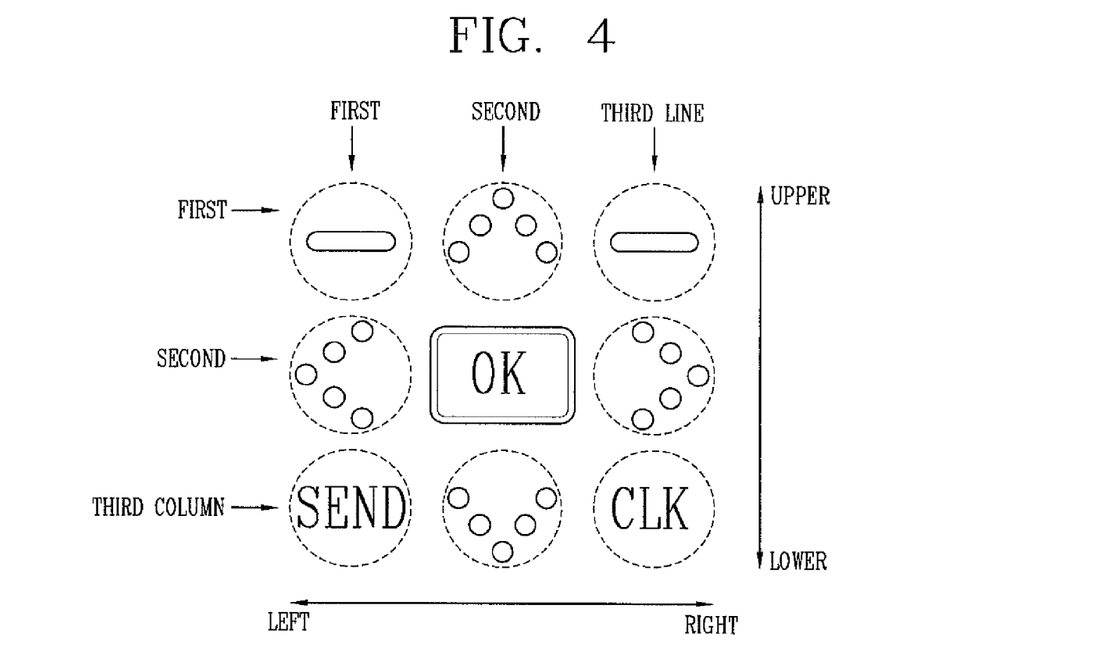
FIG. 4 illustrates key arrangement of a keypad in accordance with an embodiment of the present invention.

Methods for setting priority will now explained with reference to the key arrangement illustrated in FIG. 4. As illustrated in FIG. 4, the keys are arranged in three lines and three columns with navigation keys located in the second column of the first line, the first column of the second line, a third column of the second line and the second column of the third line.

In a first method for setting priority when two keys located in different lines are simultaneously input, such as in the first line and the second line or in the second line and the third line, a key arranged at the uppermost line is set to have a higher priority. For example, when certain keys located in the first and second lines are simultaneously input, the key in the first line is set to have the higher priority. When certain keys located in the second and third lines are simultaneously input, the key in the second line is set to have a higher priority.

In a second method for setting priority when two keys located in the same line are simultaneously input and one of the keys is a navigation key, the navigation key is set to have a higher priority. For example, if one of two keys which are simultaneously input in each line of FIG. 4 is a navigation key, such as the key in the second column of the first line, the key in the first column of the second line, the key in the third column of the second line and the key in the second column of the third line, the navigation key is set to have a higher priority.

In a third method for setting priority, when three or more keys are simultaneously input and, if the each key is located in a different line, the key is the upper line has priority and a navigation key in the upper line is set to have a highest priority.

Figure 5:
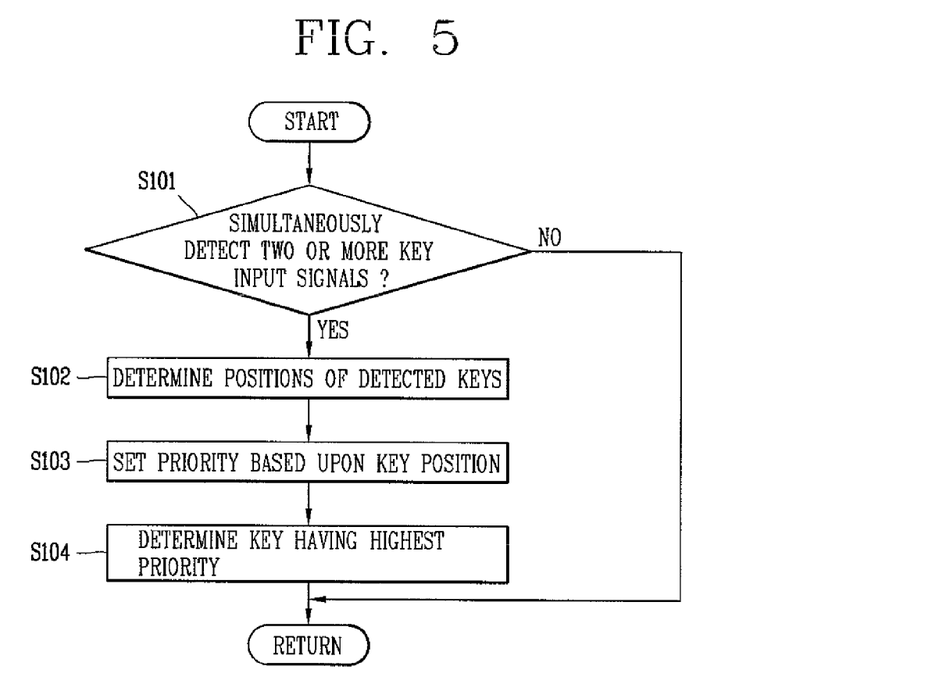
FIG. 5 is a flow chart illustrating a key input error prevention algorithm of a mobile communications terminal in accordance with a first embodiment of the present invention.

A key input error prevention algorithm using the first, second and third methods for setting priorities will now be explained. FIG. 5 is a flow chart illustrating a key input error prevention algorithm according to a first embodiment of the present invention.

As illustrated in FIG. 5, when controller 105 detects two or more key input signals at the same time (S101), the controller determines the positions, or line and column, of the detected keys (S102) and sets priorities for each key according to the priority setting methods (S103).

Once the priorities for each detected key are set, the controller 105 determines the one key having the highest priority of the detected keys (S104). Accordingly, a key input error related to two or more keys simultaneously input is prevented.

A key input error prevention algorithm in accordance with a second embodiment of the present invention prevents the key input error by determining the key input that a user desires according to a capacitance level of a signal generated when touching a keypad region 201-209.

Figure 6:
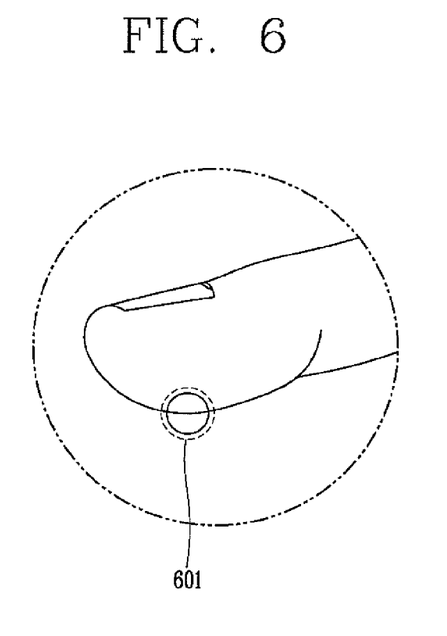
FIG. 6 illustrates a lateral side of an end portion of a typical user's finger.

FIG. 6 illustrates a lateral end portion of typical user's finger. Generally, an end of a person's finger, as illustrated in FIG. 6, has an approximately oval shape and particularly, a center portion 601 of a finger has a convex shape.

Figure 7:
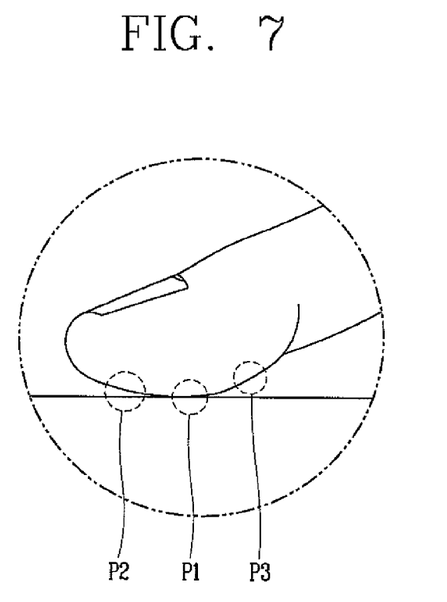
FIG. 7 illustrates a first key input method based upon the shape of a typical user's finger.
Figure 8:
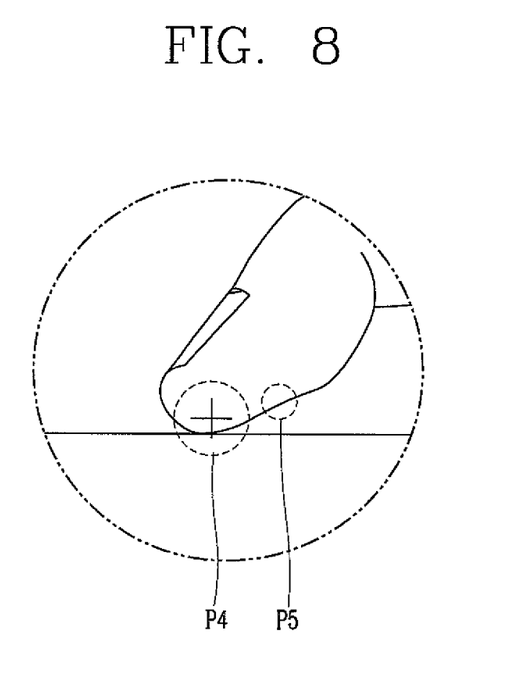
FIG. 8 illustrates a second key input method based upon the shape of a typical user's finger.

Therefore, two cases are defined for analyzing key input methods according to finger shape. The first case, as illustrated in FIG. 7, is a key input using a convex portion of a finger. The second case, as illustrated in FIG. 8, is a key input using an end portion of a finger.

A contact portion between a finger and a keypad according to the key input methods illustrated in FIGS. 7 and 8 will now be described. FIG. 7 illustrates a first key input method according to finger shape and FIG. 8 illustrates a second key input method according to finger shape.

As illustrated in FIG. 7, when inputting a key using a convex portion P1 of a finger, the convex portion directly contacts with the keypad, with other portions P2 and P3 spaced slightly apart from the keypad without directly contacting the keypad. Similarly, as illustrated in FIG. 8, upon inputting a key using an end portion P4 of a finger, the end portion directly contacts the keypad with the other portion P5 including the convex portion P1 of the finger spaced slightly apart from the keypad without directly contacting the keypad.

Figure 9:
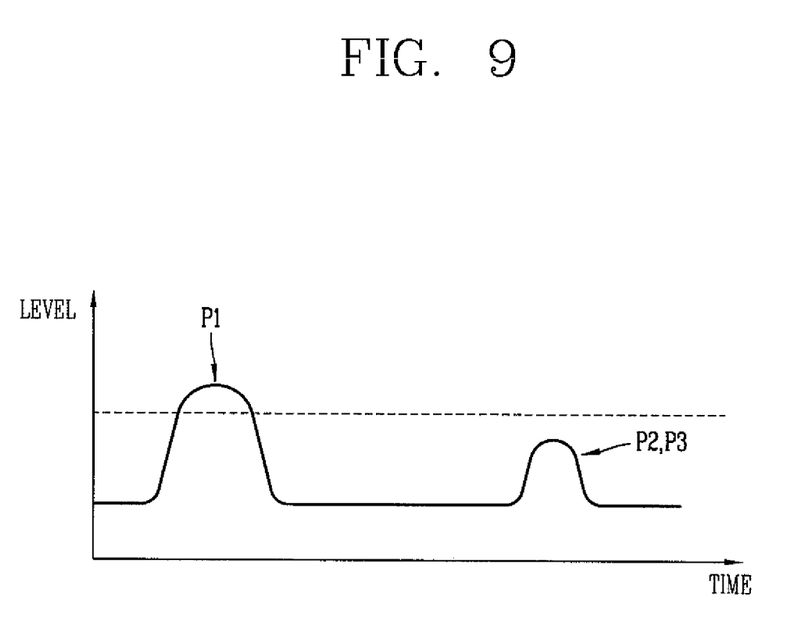
FIG. 9 illustrates a comparison of capacitance differences of signals generated by contacting a touch-type keypad according to the present invention.

Owing to the characteristics, a difference may be generated a between a capacitance signal output by a touch sensor due to the portion, for example convex portion P1 of the finger, that directly makes contact with the keypad and capacitance signals output by corresponding touch sensors due to the portions, P2 and P3 of the finger, which do not contact the keypad. As illustrated in FIG. 9, the capacitance signal of portion P1 is larger than the capacitance signals of the portions P2 and P3. In other words, a higher level signal is output when a contact distance between the finger and the keypad is smaller and a contact area between the finger and the keypad is wider.

Figure 10:
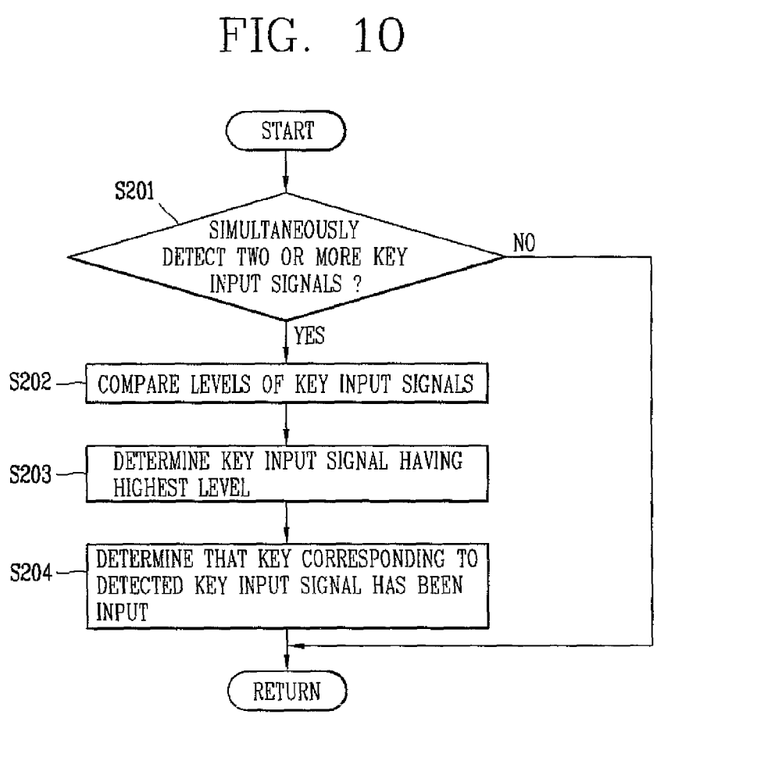
FIG. 10 is a flow chart illustrating a key input error prevention algorithm of a mobile communications terminal in accordance with a second embodiment of the present invention.

Therefore, the present invention determines the key input by comparing the sizes of the capacitance signals when two or more keys are input. FIG. 10 is a flow chart illustrating a key input error prevention algorithm in accordance with a second embodiment of the present invention.

As illustrated in FIG. 10, when the controller 105 detects two or more key input signals at the same time (S201), the controller compares levels of the corresponding key input signals (S202) to determine the key input signal having the highest level (S203). The input signal refers to a capacitance signal output from a touch sensor corresponding to each key of the keypad.

The key input is determined as the key of which the key input signal has the highest level (S204). Accordingly, a key input error related to two or more keys are simultaneously input is prevented.

However, the difference in levels between the key input signals is only obtained at the initial moment a key is input. For a user who is apt to press a key habitually, a whole finger may be contacted with the keypad after a certain time and, accordingly, the difference in levels between the key input signals may not be generated.

A key input error prevention algorithm in accordance with a third embodiment of the present invention determines a key input based on a difference in times that a finger contacts the keypad. A key, which has more quickly output a key input signal having a higher level than a reference level is determined as having been input.

Figure 11:
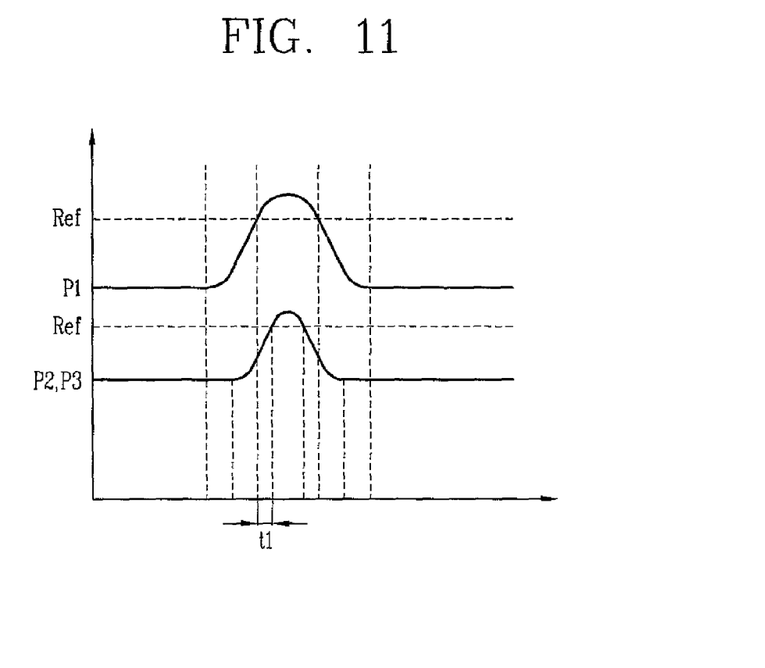
FIG. 11 illustrates a comparison of differences between key input signals generated based upon a contact time of a touch-type keypad according to the present invention.

Referring to FIG. 11, it can be noticed that the level of the key input signal of the portion P1, where the finger first contacts the keypad, reaches a reference level Ref earlier by a time t1 than the level of the key input signal of the portions P2 and P3, where the finger contacts the keypad later, reaches the reference level Ref.

Figure 12:
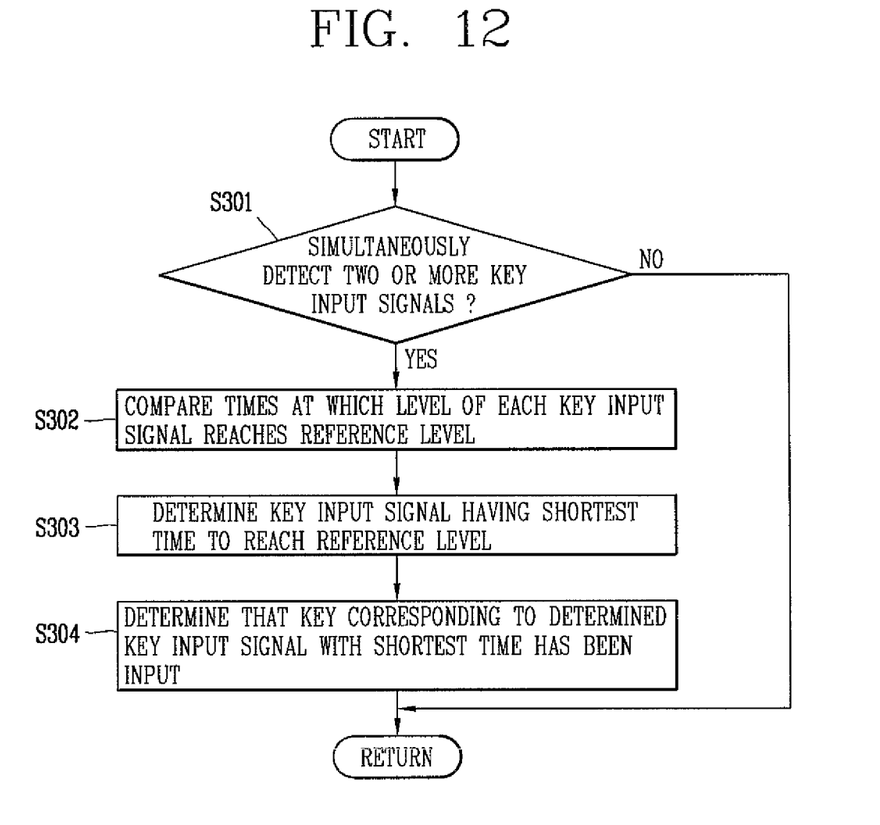
FIG. 12 is a flow chart illustrating a key input error prevention algorithm of a mobile communication terminal in accordance with a third embodiment of the present invention.

Therefore, upon inputting two or more keys, the present invention determines which key has been input by comparing the times at which the level of the corresponding key input signals reach the reference level Ref. FIG. 12 is a flow chart illustrating a key input error prevention algorithm in accordance with a third embodiment of the present invention.

As illustrated in FIG. 12, when detecting two or more key input signals at the same time (S301), the controller 105 compares the times at which the levels of the key input signals reach a reference level (S302) in order to detect the key input signal that reaches the reference level in the shortest time (S303). The key input signal denotes a capacitance signal output by a touch sensor The controller 105 detects the key input signal that reaches the reference level in the shortest time to determine that the key corresponding to that key input signal has been input (S304). Accordingly, the key input error related to two or more keys simultaneously input can be prevented.

The key input error prevention algorithms of the first three embodiments illustrated in FIGS. 5, 10 and 12 are directed to preventing structural errors generated due to a narrow interval between keys of the keypad resulting from miniaturization of the terminal. However, applying the same key sensitivity to every key that is not associated with a task performance may also generate key input errors.

For example, although certain keys, such as a navigation key, are related to specific tasks, such as a game, a menu selection task or playing multimedia, the same sensitivity is applied when detecting that a key not related to a specific task has been input, such as a communication key (SEND), a task clear key (CLR) or a phone number searching key. Therefore, the detection of an unexpected key may interrupt performance of the current task.

A key input error prevention algorithm in accordance with a fourth embodiment of the present invention is based on a classification of keys into keys related to tasks that are currently being performed and keys not related to tasks currently being performed. The sensitivities of the keys not related to tasks currently being performed are adjusted to be low in order to prevent key input error. In other words, keys that are not related to tasks that are currently being performed are determined as having been input only when the keys are input over a normal key input time.

The key sensitivity denotes a time during which a key input signal having a level higher than a threshold level is continuously maintained. Therefore, if it is assumed that a normal key sensitivity is 100 ms, the sensitivities of keys that are not related to the tasks currently being performed may be lowered by 300 ms in order to prevent the key input error.

For example, if a game task for which navigation keys are usually used is currently being performed, the normal key sensitivity is maintained for the navigation keys, but the key sensitivity is adjusted lower for keys, such as the clear key (CLR) and the communication key (SEND), which are not related to performing the game task. In related art methods, when a finger contacts the keys not related to performing the game task, such as CLR or SEND, while the game task is performed, the mobile communications terminal may clear the game being performed and transition to a standby state or transition to a mode for call communication. According to the method of the present invention, when a finger does not continuously contact the key not related to performing the game task for a period of time that exceeds the adjusted key sensitivity, such as 300 ms, the controller 105 does not determine that the key has been input and the game continues uninterrupted.

Figure 13:
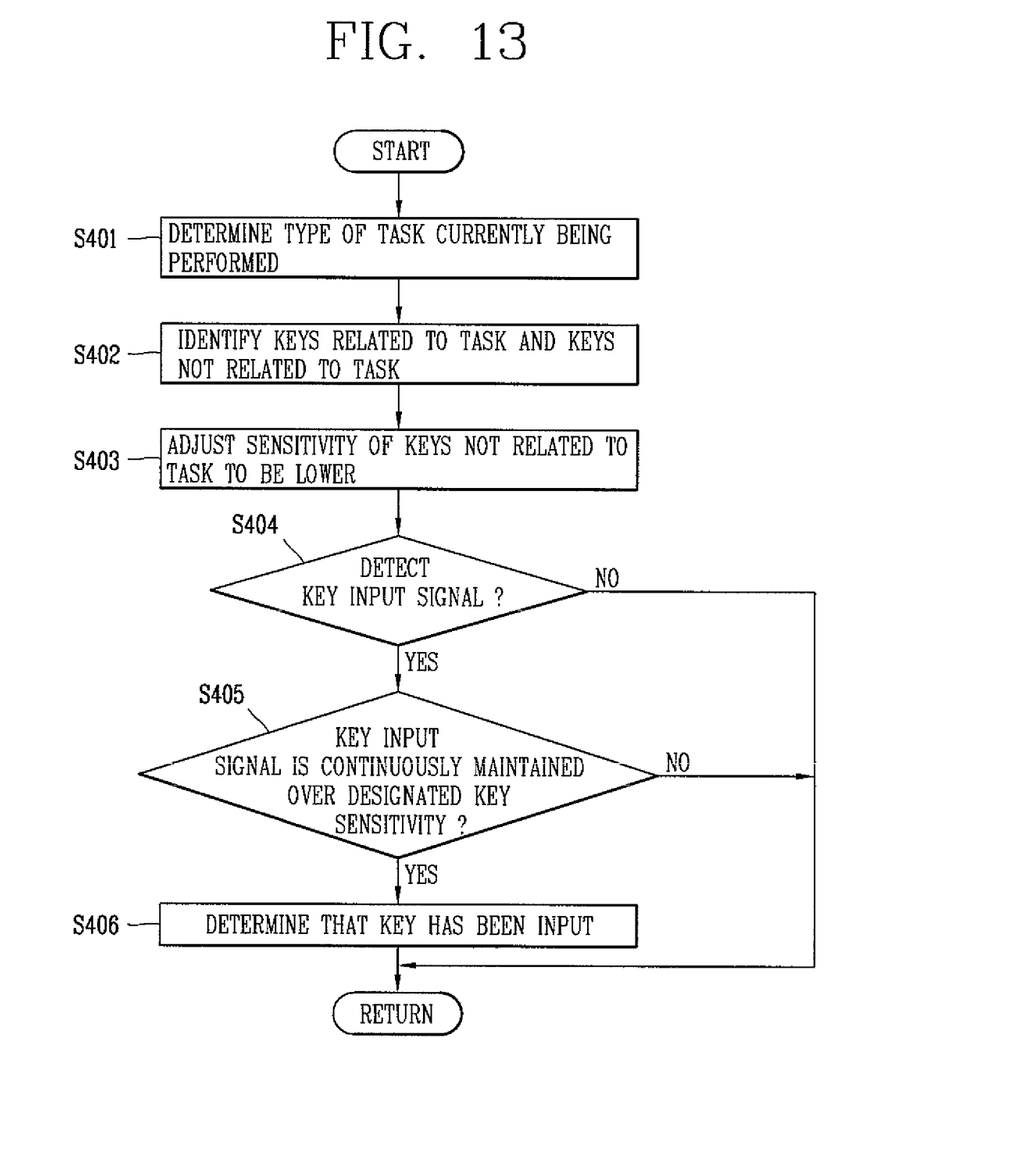
FIG. 13 is a flow chart illustrating a key input error prevention algorithm of a mobile communications terminal in accordance with a fourth embodiment of the present invention.

FIG. 13 is a flow chart illustrating a key input error prevention algorithm in accordance with a fourth embodiment of the present invention. As illustrated in FIG. 13, the controller 105 determines a task that is currently being performed (S401), and identifies keys related to the task and keys not related to the task (S402). Information related to each key related to the task is stored in the memory 103. The controller 105 refers to the key information stored in the memory 103 to adjust sensitivities of keys which are not related to the task currently being performed to be lower than a normal key sensitivity (S403).

When a key input signal is detected (S404), the controller 105 determines that the key has been input only when the key input signal is continuously maintained over the designated sensitivity (S405 and S406). For a key not related to the task currently being performed, the designated key sensitivity will be a longer period of time corresponding to the lower sensitivity. The key input signal denotes a capacitance signal output from a touch sensor corresponding to each key of the keypad. Therefore, the present invention can prevent the key input error due to inputting keys that are not related to the task currently being performed In addition to the key input errors resulting from the simultaneous input of more than one key to which the previous embodiments of the invention are directed, key input errors may be generated due to static electricity generated while carrying the terminal, static electricity generated from a human body while operating the terminal, noise generated by peripheral sources such as electrical equipment or a carpet that generates electromagnetic waves or while charging the terminal. This may be more prevalent for a mobile communication terminal having a touch-type key input unit rather than a pressing type key input unit, which generates electromagnetic waves or while charging the terminal.

Figure 14A:
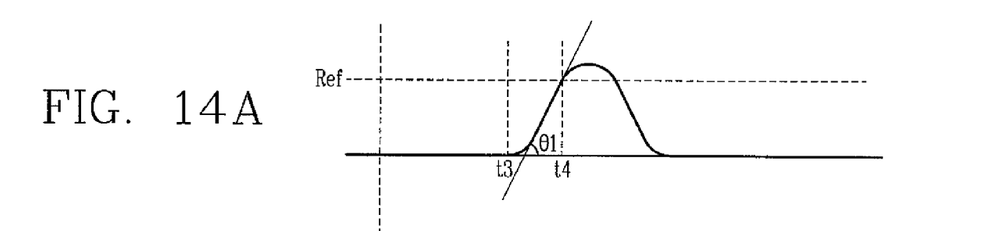
Figure 14B:
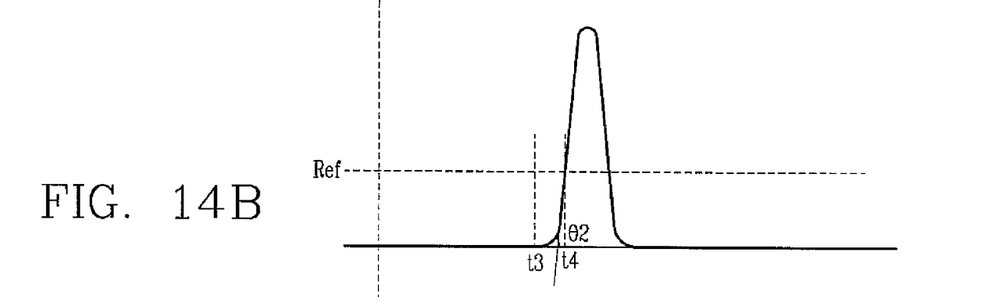
Figure 14C:
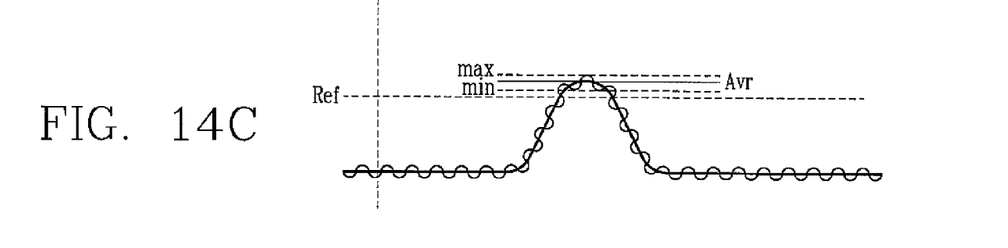

A key input error prevention algorithm in accordance with a fifth embodiment of the present invention is based on identifying and differentiating key input signals generated by static electricity or electrical noise from normal key input signals, thereby preventing the static electricity or electrical noise from being recognized as a key input signal. FIG. 14 illustrates a comparison of a normal key input signal, static electricity and a noise signal.

The normal key input signal has a certain gradient $\theta 1$, as illustrated in FIG. 14A, since the key input signal is generated from the moment a finger approaches a key and then the level rises up to its highest level. An error range of the gradient $\theta 1$ is not great, although it differs according to the speed with which a user inputs keys, since the key input speed with which a user normally inputs keys is limited.

On the other hand, a signal input due to static electricity is generated suddenly, as in FIG. 14B, and time for the signal to reach its highest level is short. Accordingly, the input signal due to static electricity has a more drastic gradient $\theta 2$ as compared to the normal key input signal, such that $\theta 2 > \theta 1$.

Therefore, the method of the present invention does not determine a detected input signal as a key input signal when it is determined that the gradient $\theta 2$ of the input signal is greater than the gradient of a normal key input signal. In this way, the present invention does not determine an input signal due to static electricity as a key input signal, thereby preventing key input error.

Each gradient $\theta 1$ and $\theta 2$ can be determined according to a rise time of the input signal or, as illustrated in FIGS. 14A and 14B, $T = t4 - t3$ = from a time t3 when the level of the input signal starts rising to a time t4 when the level of the input signal reaches a designated reference level Ref. As illustrated in FIGS. 14A and 14B, the input signal due to static electricity has a much shorter rise time than a normal key input signal. Each time t3 and t4 can be obtained using an inner timer 106 of the terminal.

When a normal key input signal contains noise having a certain frequency and level, as illustrated in FIG. 14C, the level of the key input signal may vary, thereby causing a key input error. According to the present invention, when the level of a key input signal varies within a certain range, the level of the key input signal is determined based upon an average value Avr in order to prevent a key input error.

Figure 15:
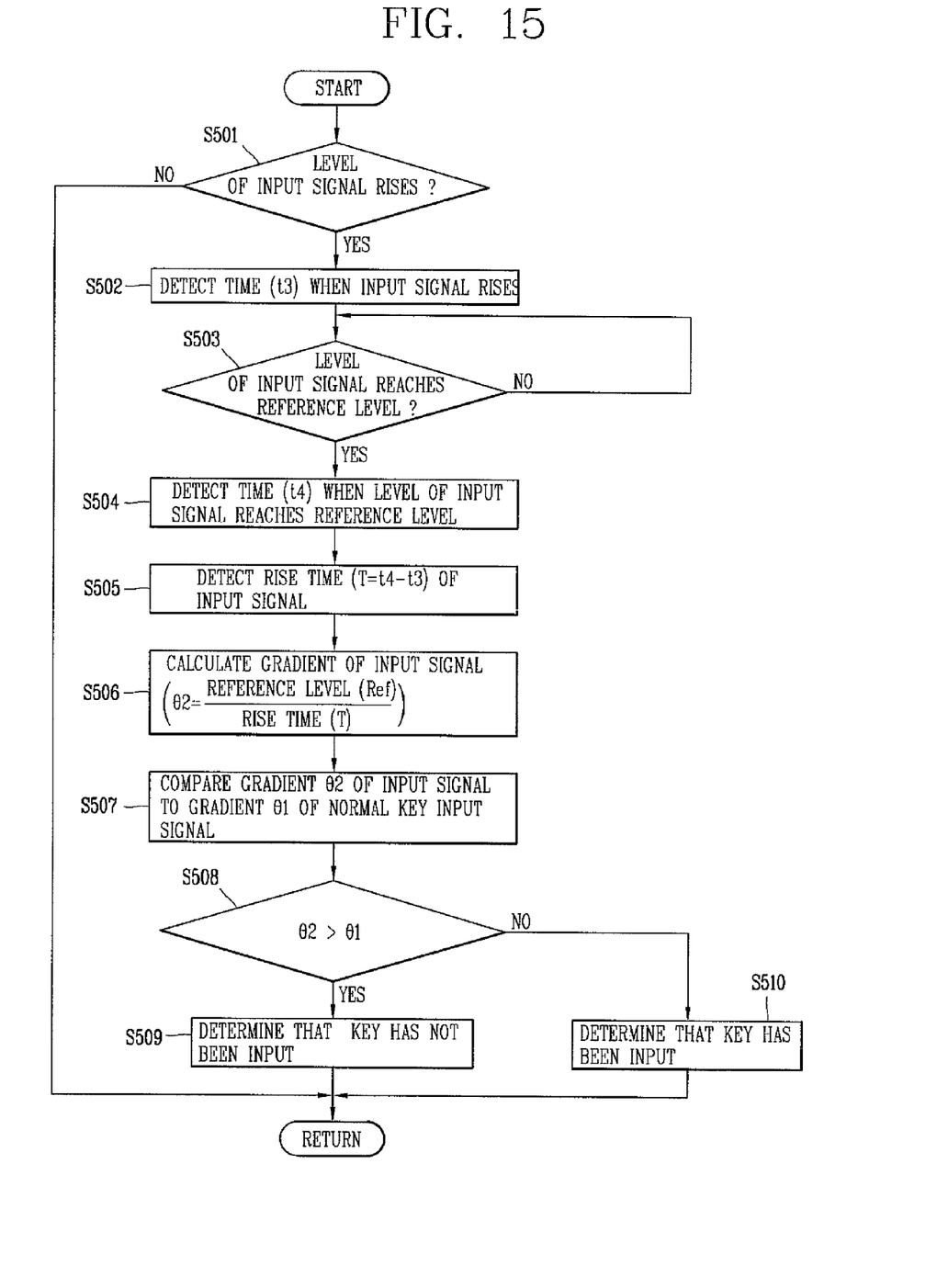
FIG. 15 is a flow chart illustrating a key input error prevention algorithm of a mobile communications terminal in accordance with a fifth embodiment of the present invention.

FIG. 15 is a flow chart illustrating a key input error prevention algorithm in accordance with a fifth embodiment of the present invention. As illustrated in FIG. 15, when the level of the signal input through a key input signal detecting port starts rising, the controller 105 detects the starting time t3 and a time t4 when the level of the key input signal reaches a designated reference level Ref (S501 through S504).

Next, the controller 105 calculates the rise time (T=Bt4−t3) of the input signal according to the determined times t4 and t3 (S505) and then divides the reference level Ref by the calculated rise time T of the input signal in order to calculate the gradient θ2 for the input signal (S506). The controller 105 then compares the gradient θ1 of the normal key input signal stored in the memory 103 to the calculated gradient θ2 of the input signal (S507).

If the calculated gradient θ2 of the input signal is greater than the gradient θ1 of the normal key input signal (S508), the controller 105 does not determine the input signal as a key input signal (S509). If the calculated gradient θ2 of the input signal is less than or equal to the gradient θ1 of the normal key input signal, the controller 105 determines the input signal as a normal key input signal (S510).

Each embodiment of the key input error prevention algorithm has been explained with regard to single generated error. However, embodiments of the key input error prevention algorithms according to the present invention may be combined or applied to prevent key input errors when several input signals are simultaneously generated.

As described herein, key input errors can be prevented using the algorithms of the present invention in a mobile communications terminal having a touch-type key input unit even when the keys of the key input unit are arranged at narrower intervals. The present invention facilitates increased user convenience and miniaturization of the terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for detecting a touch key input in a mobile communication terminal, the method comprising:
   identifying a first touch key that is not related to a task in response to a performance of the task; and
   identifying a second touch key that is related to the task in response to the performance of the task,
   wherein a sensitivity level of at least one of the first touch key or the second touch key is adjusted based on the task such that the sensitivity level of the first touch key is lower than the sensitivity level of the second touch key.

2. The method of claim 1, further comprising:
   detecting a key input signal corresponding to each of a plurality of touch keys of the mobile communication terminal within a predetermined period of time, the plurality of touch keys comprising the first touch key and the second touch key.

3. The method of claim 1, further comprising:
   determining one of a plurality of touch keys of the mobile communication terminal corresponding to a detected key input signal having a highest level; and
   recognizing the detected key input signal corresponding to the determined one of the plurality of touch keys as the touch key input.

4. The method of claim 1, further comprising:
   measuring a duration for which a level of a key input signal is continuously maintained above a predetermined level; and
   determining the key input signal as a touch key input when the duration exceeds a specific time.

5. The method of claim 4, wherein measuring the duration for which the level of the key input signal is continuously maintained comprises:
   detecting a maximum level and a minimum level of the key input signal; and
   determining the duration for which the key input signal is continuously maintained according to an average value of the maximum and minimum levels.

6. The method of claim 1, wherein the sensitivity level of the at least one of the first touch key or the second touch key is adjusted by:
   adjusting a duration for which a level of a key input signal generated by the first touch key is continuously maintained above a predetermined level to be longer than a duration for which a level of a key input signal generated by the second touch key is continuously maintained above the predetermined level.

7. The method of claim 1, wherein the sensitivity level of the first touch key is set higher than a threshold level, resulting in disabling of the first touch key.

8. A method for detecting a touch key input in a mobile communication terminal, the method comprising:
   assigning a first priority to at least one of a plurality of touch keys that is likely to receive a second input in association with a task being performed in response to a first input received; and
   assigning a second priority to at least one of the plurality of touch keys except for the at least one of the plurality of touch keys that have been assigned the first priority,
   wherein sensitivity levels of the plurality of touch keys are adjusted such that a sensitivity level of the at least one of the plurality of touch keys with the first priority is higher than a sensitivity level of the at least one of the plurality of touch keys with the second priority.

9. The method of claim 8, further comprising:
receiving an input via the at least one of the plurality of touch keys with the first priority; and
accepting the input received via the at least one of the plurality of touch keys with the first priority as the second input, the second input being associated with the determined task.

10. The method of claim 8, further comprising:
simultaneously receiving an input via the at least one of the plurality of touch keys with the first priority and the at least one of the plurality of touch keys with the second priority; and
accepting the input received via the at least one of the plurality of touch keys with the first priority as the second input but rejecting the input received via the at least one of the plurality of touch keys with the second priority as the second input.

11. The method of claim 8, further comprising:
receiving an input via one of the at least one of the plurality of touch keys with the second priority; and
measuring a duration during which an input signal is maintained, the input signal being generated by the received input; and
accepting the received input as the second input when the duration for the input signal is same or longer than a threshold level, or rejecting the received input as the second input when the duration for the input signal is shorter than the threshold level.

12. The method of claim 8, wherein the first priority and the second priority are assigned based on a statistical analysis.

13. A mobile communication terminal comprising:
a keypad having a plurality of touch keys and touch sensor units for sensing key inputs received from touching of the plurality of touch keys, and outputting a key input signal according to a sensed key input; and
a controller detecting the key input signal,
wherein the controller is configured to:
identify a first touch key that is not related to a task in response to a performance of the task; and
identify a second touch key that is related to the task in response to the performance of the task,
wherein a sensitivity level of at least one of the first touch key or the second touch key is adjusted based on the determined task such that the sensitivity level of the first touch key is lower than the sensitivity level of the second touch key.

14. The terminal of claim 13, wherein the controller is further configured to detect a key input signal corresponding to each of the plurality of touch keys within a predetermined period of time, the plurality of touch keys comprising the first touch key and the second touch key.

15. The terminal of claim 13, wherein the controller is further configured to:
determine one of a plurality of touch keys corresponding to a detected key input signal having a highest level; and
recognize the detected key input signal corresponding to the determined one of the plurality of touch keys as the touch key input.

16. The terminal of claim 13, wherein the controller is further configured to:
measure a duration for which a level of a key input signal is continuously maintained above a predetermined level by detecting a maximum level and a minimum level of the key input signal and determining the period of time for which the key input signal is continuously maintained according to an average value of the maximum and minimum levels; and
determine the key input signal as a touch key input when the duration exceeds a specific time.

17. The terminal of claim 13, wherein the controller is further configured to adjust a duration for which a level of a key input signal generated by the first touch key is continuously maintained above a predetermined level to be longer than a duration for which a level of a key input signal generated by the second touch key is continuously maintained above the predetermined level.

18. A method for detecting a touch key input in a mobile communication terminal, the method comprising:
identifying a first touch key that is not related to a task in response to a performance of the task;
identifying a second touch key that is related to the task in response to the performance of the task,
wherein a sensitivity level of the first touch key is adjusted lower than a sensitivity level of the second touch key;
determining a first contact area associated with the first touch key and a second contact area associated with the second touch key in response to an input simultaneously applied to the first touch key and the second touch key; and
executing an operation associated with the first touch key or the second touch key by processing the first contact area, the second contact area, the sensitivity level of the first touch key, and the sensitivity level of the second touch key.

19. The method of claim 18, wherein the task is a text message transmission and the operation is a writing operation of a text associated with the first key or the second key.

20. The method of claim 18, wherein the operation associated with the first touch key is performed when a combined value of the first contact area and the sensitivity level of the first touch key is greater than a combined value of the second contact area and the sensitivity level of the second touch key.

21. The method of claim 18, wherein the executing the operation associated with the first touch key or the second touch key is performed by further processing a distance between the first touch key and the input and a distance between the second touch key and the input.

* * * * *